March 1, 1927. Re. 16,561

M. F. CARR

STUD

Original Filed March 8, 1921

Inventor:
Moses F. Carr,
by Emery Booth Jenney & Varney
Attys.

Reissued Mar. 1, 1927. Re. 16,561

UNITED STATES PATENT OFFICE.

MOSES F. CARR, OF LEXINGTON, MASSACHUSETTS, ASSIGNOR TO CARR FASTENER COMPANY, OF CAMBRIDGE, MASSACHUSETTS, A CORPORATION OF MAINE.

STUD.

Original No. 1,432,783, dated October 31, 1922, Serial No. 450,751, filed March 8, 1921. Application for reissue filed October 31, 1924. Serial No. 747,123.

This invention pertains to improvements in studs, and more particularly, though not exclusively, to improvements in studs of the general character illustrated in United States Letters Patent No. 1,070,113, issued August 12, 1913, to Carr Fastener Company, assignee of Fred S. Carr. It is among the objects of the invention to provide a stud of superior appearance, of great strength and of inexpensive construction.

In the drawings, which show a preferred form of one embodiment of my invention:—

Figure 1:
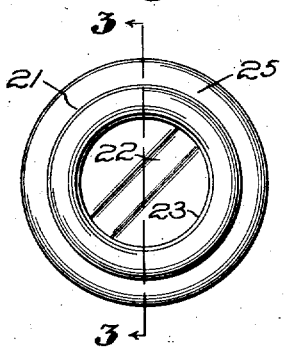
Figure 1 is an end view of a preferred form of stud.
Figure 2:
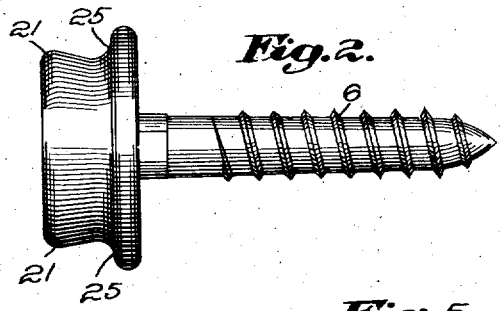
Fig. 2 is a side elevation thereof.
Figure 5:
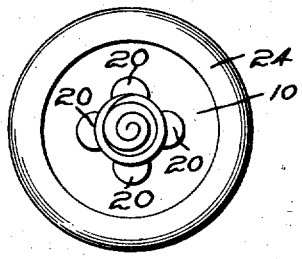
Fig. 5 is an end elevation of the stud from the screw end thereof.
Figure 3:
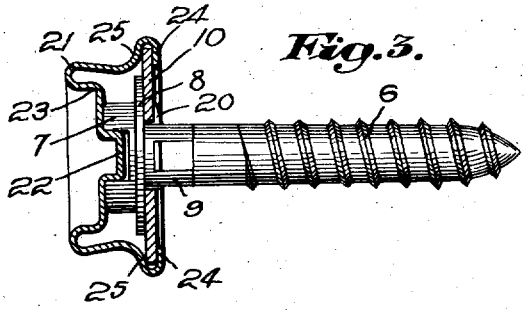
Fig. 3 is a longitudinal, medial section therethrough, the screw portion being shown in elevation.
Figure 4:
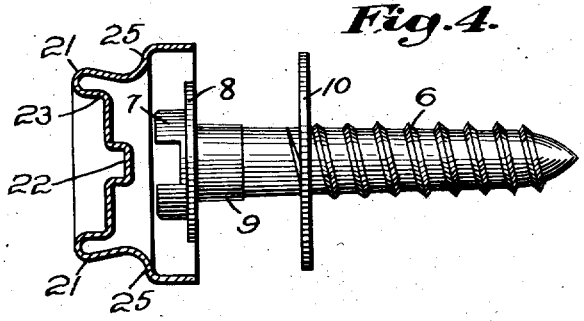
Fig. 4 is a diagrammatic view showing the parts of the stud prior to assembly.

Referring to the drawings and to the preferred form of my invention selected for illustrative purposes, I have shown a stud including a screw having a threaded portion 6, a slotted head portion 7, a collar portion 8 and a shank portion 9. The preferred form of screw is preferably provided with a washer 10 fitting over the shank portion thereof and preferably secured thereto by the pressing of shaved portions 20 of the shank 9 against the bottom of the washer. In the preferred form of my invention illustrated, the shaved portions 20 are four in number and are formed by pressing a square die over the shank of the screw.

The head or cap portion of the stud is preferably formed to provide a continuous external ring 21, serving as the head of the stud proper and with a central depressed portion 22 entering and fitting the slot in the head 7 of the screw. There may also be a circular central depression 23 to permit the use of a screw having a relatively short head in the manufacture of a stud having a cap portion of considerably greater length, and this without necessitating undue distortion of the metal by the provision of an unduly deep depression in the cap to fit the slot in the head of the screw.

The cap may be conveniently secured to the other portions of the stud by pressing the edges 24 of the cap beneath the washer 10 so that the edges of the washer 10 are pressed between the enlarged portions 25 of the head and the flanged-over edges 24 of the cap.

When a screw-driver is entered in the depression 22 of the cap, it also enters the slot in the head 7 of the screw, and therefore there is no chance of slippage between the cap portion and the screw as the latter is turned by the screw-driver.

While I have shown and described a preferred embodiment of my invention, it will be understood that considerable changes may be made therein without departing from the scope of my invention, which is best defined in the following claims.

Claims—

1. A stud for stud and socket fasteners comprising, in combination, a screw portion having a head, a slot in said head, a washer fitting over said screw portion and underlying said head and a cap portion providing a continuous peripheral ring to serve as the head of the stud and a central depressed portion fitting the slot in the head of said screw, said cap also providing portions overlying and flanged beneath said washer, thereby to hold said screw portion, said washer and stud in assembled relationship.

2. A stud for stud and socket fasteners comprising, in combination, a screw portion having a head, a slot in said head, a washer fitting over said screw portion and underlying said head and a cap portion providing a continuous peripheral ring to serve as the head of the stud and a central depressed portion fitting the slot in the head of said screw, said cap also providing portions flanged beneath said washer, thereby to hold said screw portion, said washer and stud in assembled relationship.

3. A stud for stud and socket fasteners comprising, in combination, a screw having a threaded portion, a head having a slot, and a shank portion, a washer fitting over said shank portion and held in assembled relation to said screw by projecting shaved or distorted portions of said shank pressed against the under side of said washer, and a cap portion overlying said head and interlocked with the slot therein, said cap portion secured to said washer by a lip flanged beneath said washer.

4. A stud for stud and socket fasteners comprising, in combination, a cap unit for engagement with a cooperating socket and an attaching unit for securing the stud to a suitable carrying medium, said cap unit presenting a head, a base and a generally tapered wall connecting said head and base to provide a neck, said attaching unit having a threaded shank portion, a relatively short head, and a relatively thin portion between the head and shank of the attaching unit to which is secured the cap member by crimping a portion thereof beneath said relatively thin portion, and interengaging means cooperating between the head of the cap member and the head of the attaching unit to prevent relative rotation between the two units.

In testimony whereof, I have signed my name to this specification.

MOSES F. CARR.